United States Patent
Bevier et al.

(10) Patent No.: US 10,310,075 B2
(45) Date of Patent: Jun. 4, 2019

(54) SYNTHETIC APERTURE RADAR DATA COMPRESSION AND TRANSMISSION

(71) Applicant: The Boeing Company, Chicago, IL (US)

(72) Inventors: Terence C. Bevier, Kent, WA (US); Brian H. Smith, Woodinville, WA (US); Ryan C. Sanchez, Seattle, WA (US)

(73) Assignee: The Boeing Company, Chicago, IL (US)

( * ) Notice: Subject to any disclaimer, the term of this patent is extended or adjusted under 35 U.S.C. 154(b) by 669 days.

(21) Appl. No.: 15/131,545

(22) Filed: Apr. 18, 2016

(65) Prior Publication Data

US 2017/0299713 A1    Oct. 19, 2017

(51) Int. Cl.
*G01S 13/90*    (2006.01)

(52) U.S. Cl.
CPC .......... *G01S 13/90* (2013.01); *G01S 13/9035* (2013.01); *G01S 13/9094* (2013.01)

(58) Field of Classification Search
CPC .. G01S 13/90; G01S 13/9011; G01S 13/9017; G01S 13/9023; G01S 13/9035; G01S 13/9094; G01S 2013/9041–2013/9088
See application file for complete search history.

(56) References Cited

U.S. PATENT DOCUMENTS

| | | | | |
|---|---|---|---|---|
| 6,005,982 A | * | 12/1999 | Abe | H04N 11/044 358/426.14 |
| 7,136,010 B2 | * | 11/2006 | Cirillo | G01S 7/003 342/25 R |
| 7,460,059 B1 | * | 12/2008 | Ormesher | G01S 7/292 342/159 |
| 9,146,312 B1 | * | 9/2015 | Rush | G01S 13/90 |
| 2004/0160353 A1 | * | 8/2004 | Cirillo | G01S 7/003 342/25 R |
| 2006/0109165 A1 | * | 5/2006 | Cho | G01S 13/90 342/25 R |
| 2009/0231104 A1 | * | 9/2009 | Kofman | G06K 7/10009 340/10.1 |
| 2012/0206293 A1 | * | 8/2012 | Nguyen | G01S 7/414 342/25 F |

(Continued)

*Primary Examiner* — Peter M Bythrow
(74) *Attorney, Agent, or Firm* — MH2 Technology Law Group LLP (57) ABSTRACT

The present disclosure generally relates to techniques for processing complex-valued array data representing an image. The techniques may include obtaining an electronic representation of an array of complex numbers representing an image, converting the array of complex numbers to an array of scaled coordinate pair values in a magnitude-phase plane, replacing each coordinate pair value with data representing a respective nearest node in a quantized magnitude-phase plane, such that an array of scaled quantized coordinate value pairs is produced, arranging into a sequence of bit values ordered according to decreasing bit significance, from most-significant bit values to least-significant bit values, the scaled quantized coordinate value pairs, and transmitting the sequence of bit values to a receiver, such that the receiver rearranges and rescales the sequence of bit values and obtains the image represented by the array of complex numbers.

20 Claims, 6 Drawing Sheets

(56) References Cited

U.S. PATENT DOCUMENTS

2016/0069996 A1* 3/2016 Wilby .................. G01S 7/28
367/88
2016/0119798 A1* 4/2016 Gil .................. H04W 24/02
370/252

* cited by examiner

SYNTHETIC APERTURE RADAR DATA COMPRESSION AND TRANSMISSION

GOVERNMENT LICENSE RIGHTS

This invention was made with Government support. The government has certain rights in this invention.

FIELD

This disclosure relates generally to handling, transmitting, processing, and using electronic image data that includes a phase component.

BACKGROUND

In prior art techniques for compression and transmission of image data that includes a phase component, a receiving user must wait until all of the data has been received before any data processing can be performed. A bad combination of large data volume and low network bandwidth can result in a very large wait time.

SUMMARY

According to various examples, a method of obtaining, preparing, and transmitting complex-valued array data representing an image is provided. The method includes obtaining, by an electronic processor, an electronic representation of an array of complex numbers, where the array of complex numbers represents an image; converting, by an electronic processor, the array of complex numbers to an array of scaled coordinate pair values in a magnitude-phase plane; replacing, by an electronic processor, each coordinate pair value with data representing a respective nearest node in a quantized magnitude-phase plane, such that an array of scaled quantized coordinate value pairs is produced; arranging, by an electronic processor, into a sequence of bit values ordered according to decreasing bit significance, from most-significant bit values to least-significant bit values, the scaled quantized coordinate value pairs; and transmitting the sequence of bit values to a receiver, such that the receiver rearranges and rescales the sequence of bit values and obtains the image represented by the array of complex numbers.

Various optional features of the above examples include the following. The obtaining may include obtaining synthetic aperture RADAR data acquired by a mobile airborne platform. The transmitting may include transmitting: a scaling factor associated with the array of scaled quantized coordinate pair values, and data sufficient to map the data representing a respective nearest node to a respective point in a magnitude-phase plane. The converting, replacing, and arranging may be performed by at least one hardware parallel processing device, the at least one hardware parallel processing device comprising a plurality of processing cores. The method may include targeting an object based on the image represented by the array of complex numbers.

According to various examples, a method of receiving, decompressing, and processing complex-valued array data representing an image is provided. The method includes receiving an electronic representation of a sequence of bit values representing an image, where the sequence of bit values are ordered according to decreasing bit significance, from most-significant bit values to least-significant bit values; rearranging, by an electronic processor, the sequence of bit values into an array of scaled quantized coordinate value pairs; converting, by an electronic processor, the array of scaled quantized coordinate value pairs to an array of complex numbers; and displaying, on a computer monitor, an image represented by the array of complex numbers.

Various optional features of the above examples include the following. The receiving may include receiving data derived from synthetic aperture RADAR data acquired by a mobile airborne platform. The receiving may include receiving: a scaling factor associated with the array of scaled quantized coordinate pair values, and data sufficient to map the data representing a respective nearest node to a respective point in a magnitude-phase plane. The converting may be performed by at least one hardware parallel processing device, the at least one hardware parallel processing device comprising a plurality of processing cores. The method may include targeting an object based on the image represented by the array of complex numbers.

According to various examples, a system for obtaining, preparing, and transmitting complex-valued array data representing an image is presented. The system includes a network interface comprising an electronic processor, communicatively coupled to a transceiver, and configured to obtain an electronic representation of an array of complex numbers, where the array of complex numbers represents an image; and at least one electronic processor configured to: convert the array of complex numbers to an array of scaled coordinate pair values in a magnitude-phase plane; replace each coordinate pair value with data representing a respective nearest node in a quantized magnitude-phase plane, such that an array of scaled quantized coordinate value pairs is produced; and arrange into a sequence of bit values ordered according to decreasing bit significance, from most-significant bit values to least-significant bit values, the scaled quantized coordinate value pairs; where the transceiver is configured to transmit the sequence of bit values to a receiver, such that the receiver rearranges and rescales the sequence of bit values and obtains the image represented by the array of complex numbers.

Various optional features of the above examples include the following. The transceiver may be configured to obtain synthetic aperture RADAR data acquired by a mobile airborne platform. The transceiver may be further configured to transmit: a scaling factor associated with the array of scaled quantized coordinate pair values, and data sufficient to map the data representing a respective nearest node to a respective point in a magnitude-phase plane. The at least one electronic processor may include at least one hardware parallel processing device, the at least one hardware parallel processing device comprising a plurality of processing cores. The system may include at least one processor configured to target an object based on the image represented by the array of complex numbers.

According to various examples, a system for receiving, decompressing, and processing complex-valued array data representing an image is presented. The system includes a network interface comprising an electronic processor, communicatively coupled to a transceiver, and configured to obtain an electronic representation of a sequence of bit values representing an image, where the sequence of bit values are ordered according to decreasing bit significance, from most-significant bit values to least-significant bit values; at least one electronic processor configured to: rearrange the sequence of bit values into an array of scaled quantized coordinate value pairs; and convert the array of scaled quantized coordinate value pairs to an array of complex numbers; and a computer monitor configured to display an image represented by the array of complex numbers.

Various optional features of the above examples include the following. The sequence of bit values may represent a synthetic aperture RADAR image. The transceiver may be further configured to obtain: a scaling factor associated with the array of scaled quantized coordinate pair values, and data sufficient to map the data representing a respective nearest node to a respective point in a magnitude-phase plane. The at least one electronic processor may include at least one hardware parallel processing device, the at least one hardware parallel processing device comprising a plurality of processing cores. The system may include at least one processor configured to target an object based on the image represented by the array of complex numbers.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Disclosed are techniques for the compression, transmission, reception, and progressive decompression of complex-number-valued image data ("complex image data") over a network. Some examples reduce the volume of the transmitted data, in comparison to prior art techniques through the use of a quantized magnitude-phase plane. Some examples transmit the complex image data in decreasing bit-significance order, instead of in array-element order, and a receiving entity can then process the data prior to the completion of the transmission. In such examples, each successive bit segment of the transmitted data increases the signal to noise ratio (fidelity) of the data. These and other examples are described herein in detail.

Figure 1:
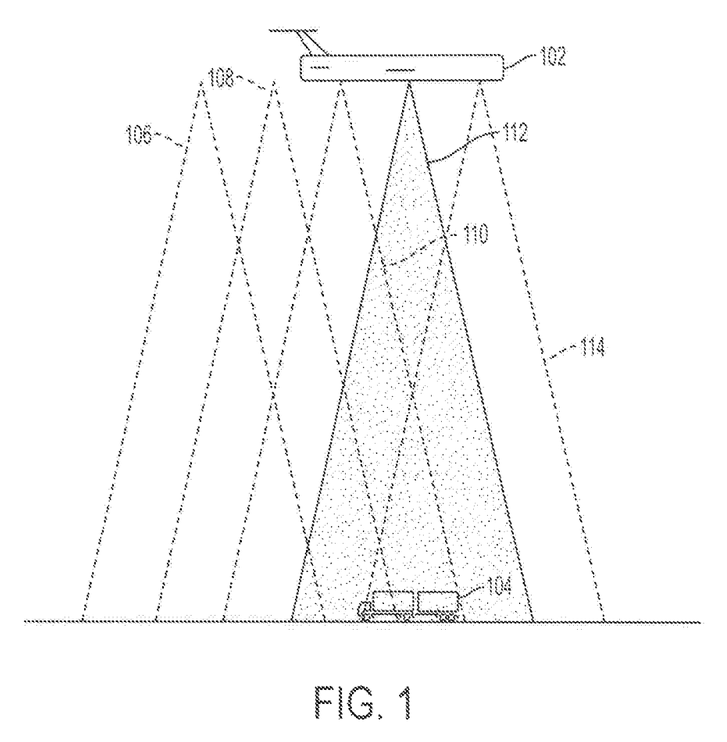
FIG. 1 is a schematic diagram of an airborne platform acquiring synthetic aperture RADAR (SAR) data according to various examples.

FIG. 1 is a schematic diagram of airborne platform 102 acquiring synthetic aperture RADAR (SAR) data according to various examples. SAR is a know technique for acquiring specialized image data. It utilizes mobility of the RADAR platform to simulate a large antenna (aperture). More particularly, it uses multiple send/receive cycles to obtain amplitude and phase information about target object 104 from a variety of observation locations. These data are synthetically (e.g., in silico, or electronically) combined in order to form detailed image data of the target.

As shown in FIG. 1, airborne platform 102 transmits RADAR energy from a series of locations along its flight path. The RADAR energy may have a wavelength of any of a variety of values, e.g., any value between 1 mm and 1 m. Airborne platform 102 senses reflections (echoes) off of target object 104 of each transmission 106, 108, 110, 112, 114. FIG. 1 shows past RADAR transmissions 106 (short dotted lines), 108, 110, current RADAR transmission 112 (solid lines), and future RADAR transmission 114 (long dotted lines). Note that multiple transmissions (110, 112, 114) impinge upon target object 104. The echoes of these transmissions off of target object 104 are synthetically combined, e.g., on airborne platform 102 or at a different location, and the resulting image data is then used for any of a variety of purposes. Such purposes include, e.g., navigation, cartography, surveillance, reconnaissance, and targeting.

SAR image data is typically included in an array, e.g., a matrix. The array may be two-dimensional or three-dimensional. Two dimensional arrays may store amplitude and phase data for each array element, representing two-dimensional pixels. Each complex number may represent or contribute to properties of one or more pixels. Thus, two-dimensional arrays may depict object surfaces. Three-dimensional arrays may store amplitude and phase information for each array element, representing three-dimensional voxels. Each complex number may represent or contribute to properties of one or more voxels. Thus, three-dimensional arrays may depict object volume.

An advantage of SAR over conventional RADAR is that the resulting image data includes both amplitude and phase information of the reflected synthetic aperture RADAR energy. The phase information permits resolution of features that are shorter than the wavelength of the electromagnetic energy. In general, without phase information, RADAR resolution is limited to objects no smaller than the associated energy's wavelength. Thus, SAR permits relatively high-definition imaging in comparison to other RADAR techniques. Other advantages of using image data that includes phase information are also present.

Figure 2:
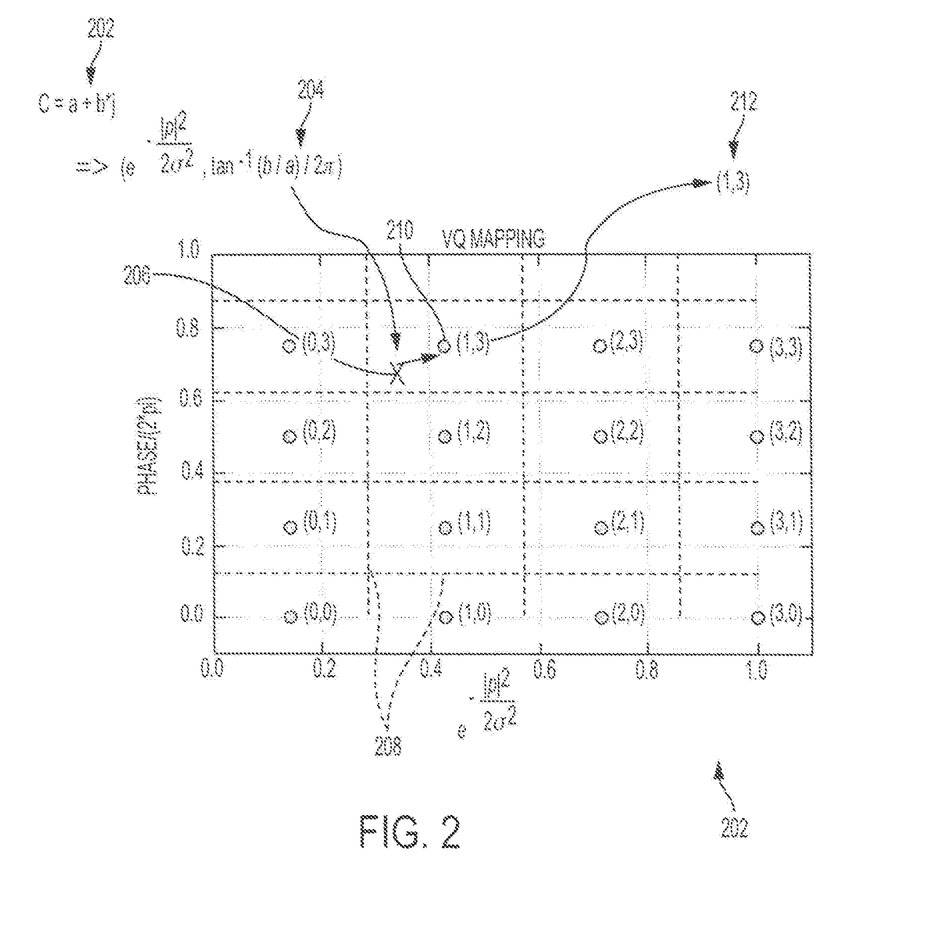
FIG. 2 is a schematic diagram of a technique for compression of image data that includes amplitude and phase information according to various examples.

FIG. 2 is a schematic diagram of a technique for compression of image data that includes amplitude and phase information according to various examples. The technique of FIG. 2 may be performed in part by properly configured computer hardware, e.g., as shown and described in reference to FIG. 6. In particular, the technique of FIG. 2 may be performed by specialized parallel-processing (e.g., graphical processing unit) computer hardware.

The technique of FIG. 2 may input an array of complex image data and output a corresponding array of coordinate pair values in a scaled magnitude-phase plane. Each element of the input array may represent a complex number, e.g., $C=a+bj$ (202), where a and b are real numbers, respectively referred to as the "real" and "imaginary" parts of the complex number C. The symbol j represents the square root of negative one, i.e., the imaginary unit. In practice, the elements a and b may be stored in a data structure that allots designated positions to the real and imaginary parts. For example, an array may include an ordered pair (a, b) representing each respective a+bj in each array element.

The technique of FIG. 2 initially takes each complex array element, e.g., C (202) and converts it to an associated scaled magnitude and phase coordinate pair, e.g., 204. In general, the complex plane (i.e., the plane of complex numbers) is typically represented with the x-axis representing the real part of and the y-axis representing the imaginary part. Any point in the complex plane can be represented by Cartesian coordinates (a, b), or by a magnitude value and a phase value in a magnitude-phase plane, e.g., a scaled magnitude-phase plane. The magnitude may represent a scaled distance from the origin (0, 0), and the phase may represent a scaled angle from the positive x-axis as measured toward the first quadrant. This part of the technique may map a complex array element (e.g., (a, b)) to scaled magnitude-phase coordinate pair (204), which may be represented as, by way of non-limiting example:

$$\left( e^{-\frac{|a^2+b^2|^2}{2\sigma^2}}, 1/2\pi \tan^{-1}(b/a) \right) \quad (1)$$

In Formula (1), the term e is the natural logarithm base, and a is a scaling factor. The scaling factor may be selected as the mean of the amplitudes of the elements in the complex-valued array, for example. Geometrically, this may be viewed as a change of coordinate systems from Cartesian coordinates to polar coordinates, along with scaling such that the polar coordinates both lie in the interval [0, 1), but where the scaled polar coordinates are plotted in a Cartesian plane (e.g., magnitude-phase plane 200) as if they were Cartesian coordinates. Thus, complex number (202) is mapped to geometric element 206 in the phase-magnitude plane, which may be viewed as a Cartesian representation of scaled polar coordinates.

Next, the scaled magnitude-phase coordinate pair 204 is quantized. This is represented in FIG. 2 by use of an imposed $2^M \times 2^P$ grid on the unit square, where M and P are a user-selected number of integer bits used to represent the magnitude and phase data. The smaller the values for M and P, the more compression results from the quantization. If M and P are selected such that the grid intervals match the resolution of the input data, then no compression occurs. Thus, in general, M and P are selected such that their exponentials are less than the number of bits in the image data representation. As an example of suitable values for these parameters, for 32-bit input data, the following may be used: M=P=12.

In FIG. 2, parameters are selected as M=P=2, such that the grid is $2^2 \times 2^2$ (=4×4). Other values for these parameters are possible. Rectangles formed by grid lines 208 in FIG. 2 represent individual quantization zones. That is, the quantization operation includes mapping each geometric element 206 (more particularly, scaled magnitude-phase coordinate pair 204) to the respective center node of the rectangular quantization zone in which it appears. Note that the phase wraps from 0 to 2π; those phase values close to 1 are mapped to nodes with phase coordinate 0. The nodes may be present at the following Cartesian coordinate value pairs:

$$\left( \frac{1}{2(2^M - 0.5)} + \frac{m}{(2^M - 0.5)}, \frac{p}{2^P} \right) \quad (2)$$

In Formula (2), M and P are as above, m ranges from 0 to $2^M$, and p ranges from 0 to $2^P$. Each node (e.g., node 210) is identified with its (m, p) coordinates (e.g., coordinate value pair (212)).

To summarize the technique of FIG. 2, a given complex number (e.g., 202) of a complex array is mapped to its Cartesian representation of a scaled polar coordinate representation (e.g., 204) in a scaled magnitude-phase plane (e.g., 200), then quantized by replacing it with its nearest node (e.g., 210), resulting in a scaled quantized coordinate value pair (e.g., 212). This process may be repeated, serially, in parallel, or partially in parallel, for each complex value in an input complex array, which may be two- or three-dimensional. The parallelization may exploit hardware parallel processors by assigning each processor a different complex number of the input array to process as disclosed. The output is a same-size array of coordinate value pairs, where each pair represents a quantized magnitude value and quantized phase value. The output array may be electronically stored in persistent or transient memory.

Figure 3:
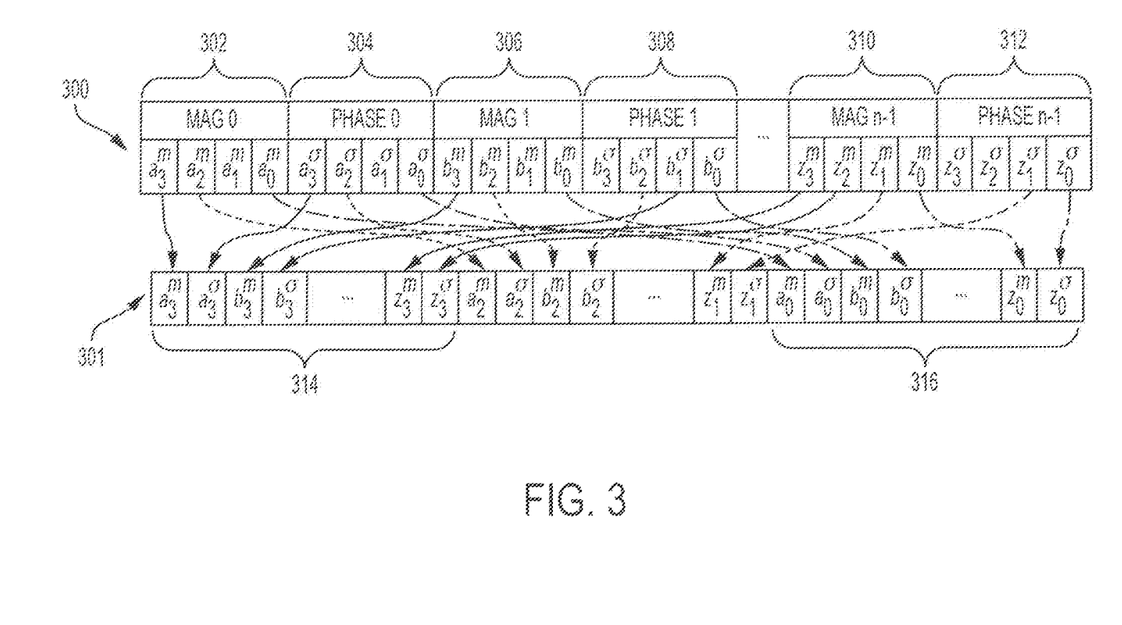
FIG. 3 is a schematic diagram of a technique for transmission prioritization of image data that includes amplitude and phase information according to various examples.

FIG. 3 is a schematic diagram of a technique for transmission prioritization of image data that includes amplitude and phase information according to various examples. The technique of FIG. 3 may be used to provide progressively higher-resolution data during transmission. More particularly, the technique of FIG. 3 may be used to transmit image data in a manner that permits initial processing of the image data before the entirety of the image data is received. The technique of FIG. 3 may be performed by properly configure computer hardware, e.g., as shown and described in reference to FIG. 6. In particular, the technique of FIG. 3 may be performed by specialized parallel-processing computer hardware.

A typical prior art technique for transmitting array image data in (magnitude, phase) format is to successively transmit, according to some order imposed on the array, each (magnitude, phase) pair in its entirety before beginning to transmit the next (magnitude, phase) pair. A disadvantage of this approach is that is does not readily permit image processing of partially-received data. The technique of FIG. 3, by contrast, so permits.

As shown in FIG. 3, bit values of the coordinate value pairs 300 in the image data array are initially arranged sequentially, e.g., lexicographically, first by coordinate index, then by magnitude/phase identify, and finally by bit significance. For purposes of FIG. 3, the coordinate pairs may be considered as residing in magnitude-phase space, although the technique of FIG. 3 may be applied to any arrays of any pairs of numbers as represented in binary. Thus, the first value coordinate pair is represented as magnitude bit portion 302 followed by phase bit portion 304. The second coordinate pair is next and is represented by magnitude bit portion 306 followed by phase bit portion 308. This ordering continues until the last coordinate pair as represented by magnitude bit portion followed by phase bit portion 312. Within each portion 302, 304, 306, 308, 310, 312, the bits values of the coordinate value pairs 300 are arranged in descending order of significance.

To re-arrange the image data for transmission prioritization, the technique re-orders the data according to bit significance, from greatest to least. Within each set of bits with the same bit significance, the technique orders first according to coordinate value pairs (e.g., lexicographically), and then according to magnitude/phase identity. Thus, most significant bits 314 are arranged to have the most significant bits from the first magnitude and phase coordinate value pair, then from the second magnitude and then phase coordinate value pair, and so on, until the most significant bits of all the coordinate value pairs have each been accounted for. This process is continued in decreasing order of bit significance, with each particular bit significance value including ordered magnitude and phase bits from the coordinate value pairs ordered according to, e.g., lexicographic ordering of the coordinate value pairs. Last in the order are least significant bits 316, again internally ordered by coordinate value pair index and magnitude/phase.

The re-arranged coordinate data results in bit sequence 301, which may be stored in, e.g., volatile memory and set for transmission according to some examples.

Figure 4:
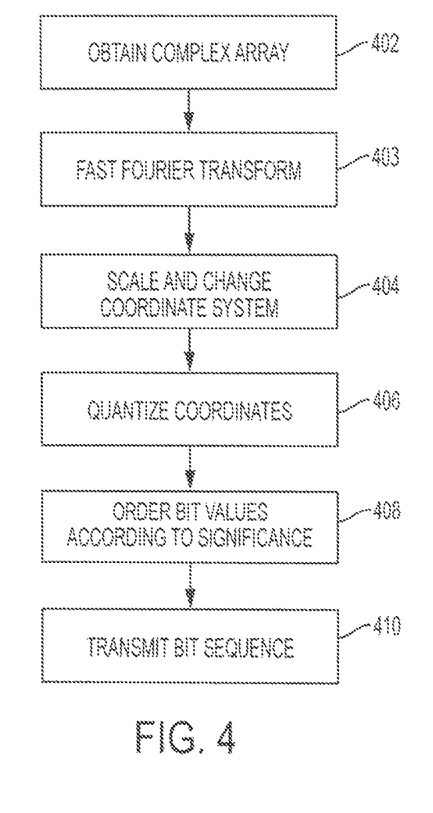
FIG. 4 is a workflow diagram of a technique for compressing and transmitting image data that includes amplitude and phase information according to various examples.

FIG. 4 is a workflow diagram of a technique for compressing and transmitting image data that includes amplitude and phase information according to various examples. The technique of FIG. 4 may utilize the techniques shown and described herein in reference to FIGS. 1, 2, and 3. The technique of FIG. 4 may be implemented by specialized computer hardware (e.g., parallel processing hardware) as shown and described in reference to FIG. 6 and elsewhere herein.

At block 402, the technique obtains a complex array, that is, a two-dimensional or three-dimensional electronically-stored array of complex numbers that represent an image. The technique may obtain the complex array in any or a variety of ways. According to some examples, the technique may obtain the complex array by retrieving it from electronic persistent or volatile memory. The technique may obtain the complex array over a computer network, e.g., the internet. The technique may obtain the complex array by receiving an electronic transmission, e.g., an ACARS transmission. The technique may obtain the complex array data from a synthetic aperture RADAR system, for example, e.g., on a mobile platform. Other array data providers and transmission techniques are also possible.

At block 403, the technique performs a fast Fourier transform on the complex array. This serves to transform the data from the spatial domain to the frequency domain. Note that this step is optional, e.g., in the sense that the complex array obtained at block 402 may already contain data in the frequency domain.

At block 404, the technique scales and converts to coordinates the complex array data. The actions of this block may be performed as shown and described above in reference to FIG. 2, e.g., the mapping of complex array element 202 to scaled magnitude-phase coordinate pair 204. The actions of this block may be performed in parallel using specialized computer hardware that includes multiple processing cores, for example.

At block 406, the technique quantizes the coordinates provided by block 404. The quantization may be performed as shown and described above in reference to FIG. 2, e.g., the quantization of scaled polar coordinate representation 204 by replacing it with nearest node 210 and identifying it with coordinate value pair 212. The actions of this block may be performed in parallel using specialized computer hardware that includes multiple processing cores, for example.

At block 408, the technique orders the bit values of the coordinate value pairs produced by block 406. The actions of this block may be performed as shown and described in reference to FIG. 3, for example. Further, the actions of this block may be performed in parallel using specialized computer hardware that includes multiple processing cores, for example.

At block 410, the technique transmits the data output at block 408. The transmission may be over-the-air (e.g., wireless), through a computer network, or otherwise. The transmission may be performed by an electromagnetic transmitter, for example, present terrestrially or at a mobile (e.g., airborne) platform.

Also part of block 410, the technique transmits other parameters that are subsequently used for the decoding/decompression process (e.g., as shown and described in reference to FIG. 5). The parameters may contain sufficient information to reconstruct the complex image. For example, the parameters may include a complete table containing the scaled magnitude/phase values (or complex Cartesian coordinate values) corresponding to each coordinate value pair. Alternately, the parameters may include the values selected for a, M, and P. The transmission of block 410 may be in a format that includes a header and a data payload, and the parameters may be included in the header. Alternately, the transmission of block 410 may include the parameters in a separate transmission.

The receiving entity may perform any of a variety of acts after receiving the data of block 410. For example, the receiving entity may display an image represented by the data. In such instances, the receiving entity may begin displaying the image before the transmission is complete. To accomplish this, the receiving entity may initially process the bit stream as it is received, progressively displaying the image represented by bits of increasing significance, until all bits (or sufficiently many bits for a user's purposes) are received.

Alternately, or in addition, the receiving entity may use the received data to, e.g., target an object, navigate an aircraft, perform cartography by generating map data, surveil a target by gathering information about it, and/or perform reconnaissance on an object by obtaining information about it. Other uses for the data are also contemplated.

Figure 5:
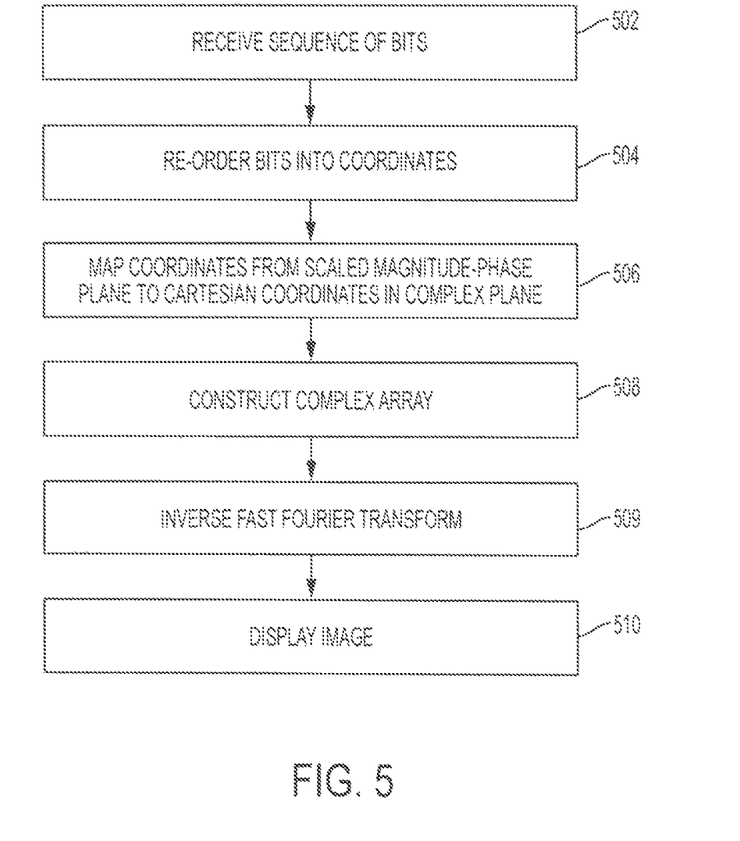
FIG. 5 is a workflow diagram of a technique for receiving and progressively decompressing image data that includes amplitude and phase information according to various examples.

FIG. 5 is a workflow diagram of a technique for receiving and progressively decompressing image data that includes amplitude and phase information according to various examples. The techniques of FIGS. 4 and 5 are conjugate in the sense that the technique of FIG. 5 may obtain and process data produced by the technique of FIG. 4. The technique of FIG. 5 may utilize the techniques shown and described herein in reference to FIGS. 1, 2, and 3. The technique of FIG. 5 may be implemented by specialized computer hardware (e.g., parallel processing hardware) as shown and described in reference to FIG. 6 and elsewhere herein.

At block 502, the technique receives a sequence of bits representing an image. The sequence of bits may be as provided by the technique of FIG. 4, for example. Thus, the sequence of bits may represent compressed complex image data that may be progressively decompressed. The technique may receive the string of bits from persistent or volatile electronic storage, for example. The technique may receive the string of bits wirelessly or through wireline communication. The sequence of bits may be received over a computer network, whether received via wireline or wirelessly.

At block 504, the technique re-orders the bits into coordinate value pairs. The actions of this block may be performed as shown and described herein in reference to FIG. 3, for example. More particularly, the actions of this block may accept a bit sequence (e.g., as bit sequence 301) and output bit values of coordinate value pairs in an image data array (e.g., 300). This may be accomplished as shown and described in reference to FIG. 3, but with the arrows in the figure reversed. Thus, bit sequence 301 is re-arranged into bit coordinate value pairs 300.

This block may also include the following technique for data loss mitigation. The coordinate value pairs may be adjusted by adding half of the least received bit value. For example, assume a 4-bit decompression (i.e., M=P=2). If only the two most significant bits have been received (bits 3 and 2, corresponding to 8 and 4), the possible coordinate values are 0, 4, 8, 12. These coordinate values may be adjusted by 2 (half the value of the lease received bit, i.e., for this example, bit 2, so the adjustment is $0.5*2^2=2$), resulting in coordinate values of 2, 6, 10, 14.

The actions of this block may be performed in parallel using specialized computer hardware that includes multiple processing cores, for example. In such an arrangement, each core may handle a different portion of the bit sequence, for example. The results of block 504 may be stored in electronic persistent of volatile memory, for example.

At block 506, the technique maps the coordinate value pairs to complex numbers. This may be accomplished by first mapping the coordinate value pairs to Cartesian coordinates a scaled magnitude-phase plane, and then to the complex numbers, or it may be accomplished simultaneously. Thus, in reference to FIG. 2, the actions of this block may accept coordinate value pairs (e.g., 212), produce corresponding scaled magnitude and phase coordinate pairs (e.g., 204), and then produce the corresponding complex numbers (e.g., 202). Alternately, these actions may be performed using the same technical procedure. Suitable formulas for such conversion appear below.

$$A = \sigma \sqrt{-2\log\left(\frac{1}{2(2^M - 0.5)} + \frac{m}{(2^M - 0.5)}\right)} \quad (4)$$

$$\theta = e^{j\frac{2\pi p}{2^P}} \quad (5)$$

$$C = A\theta \quad (6)$$

In Formulas (4), (5), and (6), an input coordinate value pair is of the form (m, p). The parameters a, M, and P are as selected earlier in the process. For a given input coordinate value pair (m, p), the process may apply Formula (4) to obtain an amplitude value A, apply Formula (5) to obtain a phase value 0, and may obtain the corresponding complex value by scalar-vector multiplication as set forth in Formula (6). This process may be repeated for each coordinate value pair.

As an alternate to the use of Formulas (4), (5), and (6), the actions of block 506 may utilize a look-up table containing the scaled magnitude/phase values (or complex Cartesian coordinate values) corresponding to each coordinate value pair. Such a table (or the parameters a, M, and P) may be obtained from a header as part of block 502, for example, or from a separate message.

The actions of block 506 may be performed in parallel using specialized parallel processing computer hardware. The results of this block may be stored in electronic persistent or volatile memory, for example.

At block 508, the technique constructs a complex array from the complex values output from block 506. The complex array may be stored in electronic persistent or volatile memory, for example. The complex array may represent a decompressed image. In some examples, each complex value represents (or contributes to) a pixel value of the corresponding image.

At block 509, the technique subjects the complex array to an inverse fast Fourier transform. This action serves to convert the complex array data from the frequency domain to the spatial domain. Note that this step is optional, e.g., the data output from block 508 may be supplied to another process or system in the frequency domain without conversion according to block 509.

At block 510, the technique displays the image corresponding to the complex array produced by block 508. The display may be on an electronic computer monitor, for example. The display may occur in a terrestrial station, or on a mobile platform, e.g., the same or different mobile platform that obtained the complex array representing the image.

Alternately, or in addition, to displaying the image, the receiving entity performing the technique of FIG. 5 may perform any of a variety of actions in response to obtaining, decompressing, and decoding the complex array. For example, the receiver may use the received data to, e.g., target an object, navigate an aircraft, perform cartography by generating map data, surveil a target by gathering information about it, and/or perform reconnaissance on an object by obtaining information about it. Other uses for the data are also contemplated.

Note that the technique of FIG. 5 may be implemented together with a Fourier transform and/or inverse Fourier transform at any of a number of points within execution of the technique.

Figure 6:
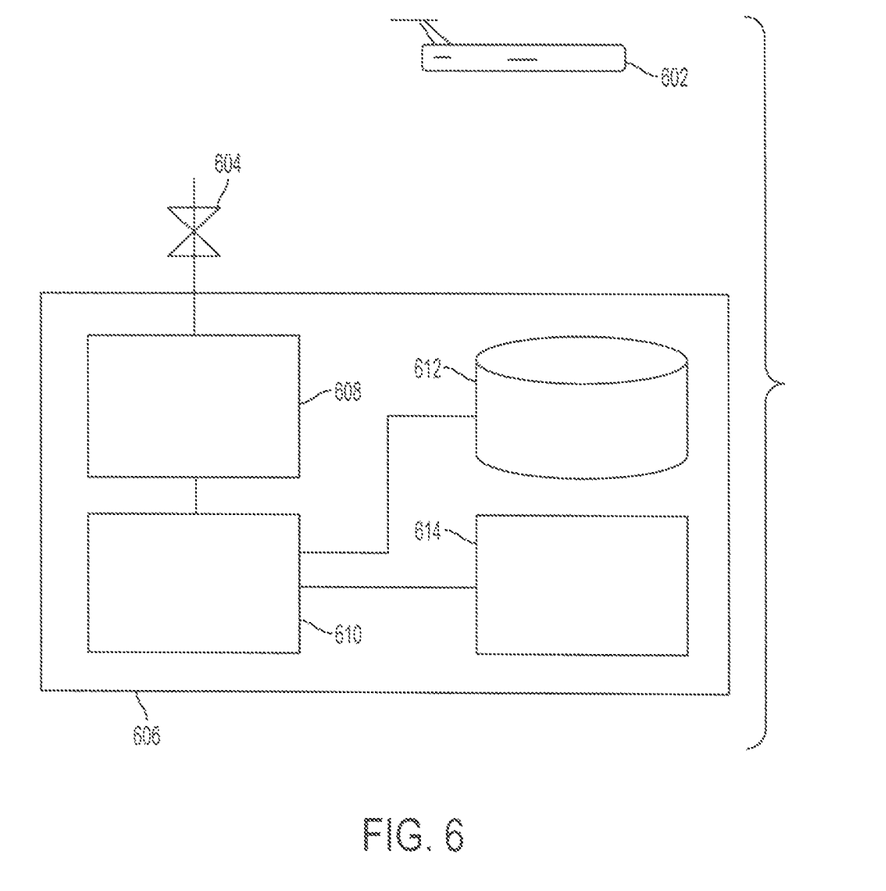
FIG. 6 is a schematic diagram of a system for implementing various examples.

FIG. 6 is a schematic diagram of a hardware system 600 for implementing various examples. The techniques disclosed herein, e.g., in reference to FIGS. 4 and 5, may be implemented using the system shown and described in reference to FIG. 6. In particular, FIG. 6 depicts aircraft 602 in communication with ground station 606. Aircraft 602 may be airborne platform 102 of FIG. 1; thus, aircraft 602 may include a synthetic aperture RADAR system. Aircraft 602 may be any type of aircraft, not limited to fixed-wing airplanes. Thus, aircraft 602 may be a helicopter, for example. Ground station 606 may be included within, communicatively coupled to, or distinct from, a terrestrial air traffic control system.

Ground station 606 may include one or more electronic processors 610, communicatively coupled to computer readable media 612 (e.g., persistent memory), parallel processors 614, and wireless transceiver 608, which itself may include a network interface capable of sending and receiving packetized digital communications. Processor(s) 610 may form part of an electronic computer, for example. Parallel processors 614 include a plurality of processing cores and may be used to perform the signal processing operations disclosed herein, e.g., any, or any combination, of the blocks of FIGS. 4 and 5. Parallel processors may include one or more hardware graphical processing units (GPUs). Wireless transceiver 608 may be coupled to antenna 604, which sends and receives data wirelessly to/from aircraft 602. Computer readable media 612 may include computer-interpretable instructions which, when executed by processor(s) 610 and/or signal co-processor 614, cause ground station 606 to perform one or more of the techniques disclosed herein.

Note that aircraft 602 of FIG. 6 may include hardware and software identical or analogous to the hardware and software in ground station 606. For example, aircraft 602 may include one or more electronic processors, communicatively coupled to computer readable media (e.g., persistent memory), to a parallel processor, and to a wireless transceiver that may include or be coupled to a network interface capable of sending and receiving packetized digital communications. The processor(s) may form part of an electronic computer, for example. The parallel processors may be used to perform the signal processing operations disclosed herein, e.g., any, or any combination, of the steps shown and described in reference to FIGS. 4 and 5. The wireless transceiver may be coupled to an antenna of aircraft 602, which sends and receives data wirelessly to/from ground station 606. The computer readable media may include computer-interpretable instructions which, when executed by the aircraft's processor(s) and/or signal co-processor, cause aircraft 602 to perform one or more of the techniques disclosed herein.

Further, the disclosed techniques are not limited to application by aircraft and ground stations. Some examples utilize spaceborne platforms, such as satellites. In other words, aircraft 602 of FIG. 6 may be replaced by a spaceborne platform in some examples.

Thus, either of the techniques of FIGS. 4 and 5 may be practiced by any of aircraft 602, ground station 606, and/or a spaceborne platform. In some examples, the techniques of FIGS. 4 and 5 may be practiced by two aircraft, such as aircraft 602, or by two ground stations, such as ground station 606. In some examples, the techniques of FIGS. 4 and 5 may be practiced by a spaceborne platform together with an aircraft (e.g., aircraft 602) or a ground station (e.g., ground station 606). Thus, examples are not limited to the communications between the example endpoints described herein. For example, examples may provide complex array data representing an image between intra-aircraft systems, or such information may be communicated between aircraft. As another example, examples may provide complex array data representing an image between intra-spaceborne platform systems, or such information may be communicated between spaceborne platforms.

It should be appreciated that computing system arrangement 600 is only one example of a computing system, and that computing system arrangement 600 may have more or fewer components than shown, may combine additional components not depicted in the example of FIG. 6, and/or computing system arrangement 600 may have a different configuration or arrangement of the components depicted in FIG. 6. The various components shown in FIG. 6 may be implemented in hardware, hardware-executing software, or a combination of both hardware and software, including one or more signal processing and/or application specific integrated circuits.

In general, the techniques disclosed herein are suitable for any image data that includes phase information. Suitable data types include those produced by, e.g., interferometry, phased arrays, etc.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of obtaining, preparing, and transmitting complex-valued array data representing an image, the method comprising:

obtaining, by an electronic processor, via a network interface communicatively coupled to a transceiver, an electronic representation of an array of complex numbers, wherein the array of complex numbers represents an image;

converting, by an electronic processor, the array of complex numbers to an array of scaled coordinate pair values in a magnitude-phase plane;

replacing, by an electronic processor, each coordinate pair value with data representing a respective nearest node in a quantized magnitude-phase plane, whereby an array of scaled quantized coordinate value pairs is produced;

arranging, by an electronic processor, into a sequence of bit values ordered according to decreasing bit significance, from most-significant bit values to least-significant bit values, the scaled quantized coordinate value pairs; and transmitting the sequence of bit values to a receiver, whereby the receiver rearranges and rescales the sequence of bit values and obtains the image represented by the array of complex numbers.

2. The method of claim 1, wherein the obtaining comprises obtaining synthetic aperture RADAR data acquired by a mobile airborne platform.

3. The method of claim 1, wherein the transmitting comprises transmitting: a scaling factor associated with the array of scaled quantized coordinate pair values, and data sufficient to map the data representing a respective nearest node to a respective point in a magnitude-phase plane.

4. The method of claim 1, wherein the converting, replacing, and arranging are performed by an electronic processor comprising at least one hardware parallel processing device, the at least one hardware parallel processing device comprising a plurality of processing cores.

5. The method of claim 1, further comprising gathering information about an object for targeting purposes based on the image represented by the array of complex numbers.

6. A method of receiving, decompressing, and processing complex-valued array data representing an image, the method comprising:

receiving via a network interface communicatively coupled to a transceiver, an electronic representation of a sequence of bit values representing an image, wherein the sequence of bit values are ordered according to decreasing bit significance, from most-significant bit values to least-significant bit values;

rearranging, by an electronic processor, the sequence of bit values into an array of scaled quantized coordinate value pairs;

converting, by an electronic processor, the array of scaled quantized coordinate value pairs to an array of complex numbers; and displaying, on a computer monitor, an image represented by the array of complex numbers.

7. The method of claim 6, wherein the receiving comprises receiving data derived from synthetic aperture RADAR data acquired by a mobile airborne platform.

8. The method of claim 6, wherein the receiving comprises receiving: a scaling factor associated with the array of scaled quantized coordinate pair values, and data sufficient to map the data representing a respective nearest node to a respective point in a magnitude-phase plane.

9. The method of claim 6, wherein the converting is performed by an electronic processor comprising at least one hardware parallel processing device, the at least one hardware parallel processing device comprising a plurality of processing cores.

10. The method of claim 6, further comprising gathering information about an object for targeting purposes based on the image represented by the array of complex numbers.

11. A system for obtaining, preparing, and transmitting complex-valued array data representing an image, the system comprising:
a network interface comprising an electronic processor, communicatively coupled to a transceiver, and configured to obtain an electronic representation of an array of complex numbers, wherein the array of complex numbers represents an image; and
at least one electronic processor configured to:
convert the array of complex numbers to an array of scaled coordinate pair values in a magnitude-phase plane;
replace each coordinate pair value with data representing a respective nearest node in a quantized magnitude-phase plane, whereby an array of scaled quantized coordinate value pairs is produced; and
arrange into a sequence of bit values ordered according to decreasing bit significance, from most-significant bit values to least-significant bit values, the scaled quantized coordinate value pairs;
wherein the transceiver is configured to transmit the sequence of bit values to a receiver, whereby the receiver rearranges and rescales the sequence of bit values and obtains the image represented by the array of complex numbers.

12. The system of claim 11, wherein the transceiver is configured to obtain synthetic aperture RADAR data acquired by a mobile airborne platform.

13. The system of claim 11, wherein the transceiver is further configured to transmit: a scaling factor associated with the array of scaled quantized coordinate pair values, and data sufficient to map the data representing a respective nearest node to a respective point in a magnitude-phase plane.

14. The system of claim 11, wherein the at least one electronic processor comprises at least one hardware parallel processing device, the at least one hardware parallel processing device comprising a plurality of processing cores.

15. The system of claim 11, further comprising at least one processor configured to gather information about an object for targeting purposes based on the image represented by the array of complex numbers.

16. A system for receiving, decompressing, and processing complex-valued array data representing an image, the system comprising:
a network interface comprising an electronic processor, communicatively coupled to a transceiver, and configured to obtain an electronic representation of a sequence of bit values representing an image, wherein the sequence of bit values are ordered according to decreasing bit significance, from most-significant bit values to least-significant bit values;
at least one electronic processor configured to:
rearrange the sequence of bit values into an array of scaled quantized coordinate value pairs; and
convert the array of scaled quantized coordinate value pairs to an array of complex numbers; and
a computer monitor configured to display an image represented by the array of complex numbers.

17. The system of claim 16, wherein the sequence of bit values represent a synthetic aperture RADAR image.

18. The system of claim 16, wherein the transceiver is further configured to obtain: a scaling factor associated with the array of scaled quantized coordinate pair values, and data sufficient to map the data representing a respective nearest node to a respective point in a magnitude-phase plane.

19. The system of claim 16, wherein the at least one electronic processor comprises at least one hardware parallel processing device, the at least one hardware parallel processing device comprising a plurality of processing cores.

20. The system of claim 16, further comprising at least one processor configured to gather information about an object for targeting purposes based on the image represented by the array of complex numbers.

* * * * *